United States Patent
Nakatani et al.

(10) Patent No.: US 10,253,215 B2
(45) Date of Patent: Apr. 9, 2019

(54) PRESSURE-SENSITIVE ADHESIVE COMPOSITION AND ACRYLIC PRESSURE-SENSITIVE ADHESIVE COMPOSITION

(71) Applicant: ARAKAWA CHEMICAL INDUSTRIES, LTD., Osaka-shi (JP)

(72) Inventors: Takashi Nakatani, Osaka (JP); Yoshimasa Sato, Tsukuba (JP); Tetsuya Kashihara, Tsukuba (JP); Yasushi Funakoshi, Osaka (JP)

(73) Assignee: ARAKAWA CHEMICAL INDUSTRIES, LTD., Osaka-shi (JP)

( * ) Notice: Subject to any disclaimer, the term of this patent is extended or adjusted under 35 U.S.C. 154(b) by 181 days.

(21) Appl. No.: 15/124,542

(22) PCT Filed: Mar. 11, 2015

(86) PCT No.: PCT/JP2015/057168
§ 371 (c)(1),
(2) Date: Sep. 8, 2016

(87) PCT Pub. No.: WO2015/137403
PCT Pub. Date: Sep. 17, 2015

(65) Prior Publication Data
US 2017/0015866 A1 Jan. 19, 2017

(30) Foreign Application Priority Data
Mar. 12, 2014 (JP) .................. 2014-048277

(51) Int. Cl.
| | | |
|---|---|---|
| C09J 201/00 | (2006.01) | |
| C09J 11/06 | (2006.01) | |
| C09J 133/00 | (2006.01) | |
| C09F 1/04 | (2006.01) | |
| C09J 133/02 | (2006.01) | |
| C09J 153/00 | (2006.01) | |
| C08L 93/04 | (2006.01) | |

(52) U.S. Cl.
CPC ............... C09F 1/04 (2013.01); C08L 93/04 (2013.01); C09J 133/00 (2013.01); C09J 133/02 (2013.01); C09J 153/00 (2013.01)

(58) Field of Classification Search
CPC .......... C09F 1/04; C09J 133/00; C09J 133/02; C09J 153/00
USPC .......................................... 524/270
See application file for complete search history.

(56) References Cited

U.S. PATENT DOCUMENTS 4,822,526 A * 4/1989 Tsuchida .................. C09F 1/04
530/217

FOREIGN PATENT DOCUMENTS

| | | |
|---|---|---|
| JP | S56-163174 | 12/1981 |
| JP | S59-230072 | 12/1984 |
| JP | 07188629 A * | 7/1995 |
| JP | H07-331207 | 12/1995 |
| JP | H08-277364 | 10/1996 |
| JP | H09-302322 | 11/1997 |
| JP | 2008-45138 A1 | 2/2008 |
| JP | 2012-214790 A1 | 11/2012 |
| WO | WO 00/06657 A2 | 2/2000 |
| WO | 2012141675 A1 | 10/2012 |

* cited by examiner

*Primary Examiner* — Kelechi C Egwim
(74) *Attorney, Agent, or Firm* — Kratz, Quintos & Hanson, LLP

(57) ABSTRACT

An object of the present invention is to provide an adhesive composition that is substantially odorless and has an extremely good color and excellent adhesive properties or tack at low temperatures of about 5° C. and in which deterioration over time caused by heat or light is suppressed. The present invention relates to an adhesive composition comprising a liquid rosin ester compound, the liquid rosin ester compound being obtained by reacting a rosin compound with a $C_{1-10}$ monohydric alcohol compound and having a Gardner color of 1 or less, a glass transition temperature of −20° C. or less, a degree of esterification of 93 wt % or more, and a ratio (Y'/Y) of the total area of peaks in 16- to 22-min retention time region (Y') to the total area of all the peaks (Y) measured by gas chromatography under the following conditions of 200 ppm or less.

3 Claims, No Drawings

PRESSURE-SENSITIVE ADHESIVE COMPOSITION AND ACRYLIC PRESSURE-SENSITIVE ADHESIVE COMPOSITION

TECHNICAL FIELD

The present invention relates to an adhesive composition and an acrylic adhesive composition.

BACKGROUND ART

Hygiene products such as disposable diapers and sanitary napkins are generally composed of a topsheet, a backsheet, a hot-melt adhesive, a stretchy material, a water-absorbent resin, a pulp fiber, and like hygiene materials. In such hygiene materials, many synthetic resins are used, and thus the hygiene materials may have an odor originating from raw-material components. Since these hygiene products are worn on a human body, even a slight odor results in user discomfort, and therefore development of an odor-free material is desired.

Among the above hygiene materials, hot-melt adhesives especially have a strong odor originating from the raw materials used. Since the odor tends to spread when the hygiene products are used, there is demand for reducing the odor.

Hot-melt adhesives contain about 30 to 50% tackifier to improve adhesive strength. Derivatives of rosin, which is a natural resin, are widely used as the tackifier.

Common rosin-based compounds are hard and brittle at room temperature, and these properties causes, for example, the following problems especially when such a rosin-based compound is incorporated into an acrylic adhesive: they lead to a decrease in tack; the adhesive hardens at low temperatures, resulting in unsatisfactory adhesive strength; and a phenomenon such as zipping is caused. In addition, rosin-based compounds are structurally susceptible to oxidative degradation due to heat or light, leading to deterioration of the adhesives.

Adhesive compositions prepared using a liquid rosin-based tackifier resin as a tackifier have been proposed (see Patent Literature 1).

Patent Literature 1 does not clearly disclose the structure and glass transition temperature (Tg) of the conventional liquid rosin-based tackifier resin used, and the adhesive showed insufficient adhesion performance at low temperatures. Moreover, in Patent Literature 1, no measure is taken for the stability of the adhesive to heat or light.

Further, an adhesive containing a rosin-based compound as a tackifier and having an odor level low enough for the adhesive to be used as a hygiene material has not yet been developed.

CITATION LIST

Patent Literature

PTL 1: JPH09-302322A

SUMMARY OF INVENTION

Technical Problem

An object of the present invention is to provide an adhesive composition that is substantially odorless and has an extremely good color and excellent adhesion properties or tack at low temperatures of about 5° C. and in which deterioration over time caused by heat or light is suppressed.

Solution to Problem

The present inventors conducted extensive research to develop such an adhesive composition as described above, and found that the object can be achieved by using a specific tackifier. The present invention has been accomplished based on this finding.

More specifically, the present invention relates to an adhesive composition and acrylic adhesive composition shown in Items 1 to 5 below.

Item 1. An adhesive composition comprising a liquid rosin ester compound, the liquid rosin ester compound being obtained by reacting a rosin compound with a $C_{1-10}$ monohydric alcohol compound and having a Gardner color of 1 or less, a glass transition temperature of −20° C. or less, a degree of esterification of 93 wt % or more, and a ratio (Y'/Y) of the total area of peaks in the 16- to 22-min retention time region (Y') to the total area of all the peaks (Y) measured by gas chromatography under the following conditions of 200 ppm or less.

Gas Chromatography Measurement Conditions
Model: product name Agilent 7890A, produced by Agilent
Column: product name HP-5 (inner diameter: 0.32 mm×30 m), produced by Agilent
Column temperature: 50° C.×5 min 10° C./min 300° C.×5 min
Inlet temperature: 300° C.
Carrier gas flow rate: $N_2$, 0.5 ml/min
Detector: hydrogen flame ionization detector (FID)

Item 2. The adhesive composition according to Item 1, wherein the liquid rosin ester compound has an acid value of 2 mg KOH/g or less.

Item 3. The adhesive composition according to Item 1 or 2, wherein the rosin compound is at least one member selected from the group consisting of disproportionated rosins and hydrogenated rosins.

Item 4. An acrylic adhesive composition comprising the adhesive composition according to any one of Items 1 to 3, the adhesive composition comprising an acrylic polymer.

Item 5. The adhesive composition according to any one of Items 1 to 4 for use as a hygiene material.

Advantageous Effects of Invention

The adhesive composition of the present invention is substantially odorless and colorless, exhibits good adhesive strength or tack at low temperatures, and has excellent heat resistance and light resistance for a long period of time. Thus, the adhesive composition of the present invention can be suitably used as a hygiene material.

DESCRIPTION OF EMBODIMENTS

The adhesive composition of the present invention comprises a liquid rosin ester compound, the liquid rosin ester compound being obtained by reacting a rosin compound with a $C_{1-10}$ monohydric alcohol compound and having a Gardner color of 1 or less, a glass transition temperature of −20° C. or less, a degree of esterification of 93 wt % or more, and a ratio (Y'/Y) of the total area of peaks in the 16- to 22-min retention time region (Y') to the total area of all the peaks (Y) measured by gas chromatography under the following conditions of 200 ppm or less.

Gas Chromatography Measurement Conditions
Model: product name Agilent 7890A, produced by Agilent
Column: product name HP-5 (inner diameter: 0.32 mm×30 m), produced by Agilent
Column temperature: 50° C.×5 min→10° C./min→300° C.×5 min
Inlet temperature: 300° C.
Carrier gas flow rate: $N_2$, 0.5 ml/min
Detector: hydrogen flame ionization detector (FID)

Various known rosins can be used without particular limitation as the rosin compound, which is a constituent of the liquid rosin ester compound. Examples of rosin compounds include natural rosins, such as gum rosin, tall oil rosin, and wood rosin; purified rosins obtained by purifying natural rosins; hydrogenated rosins obtained by subjecting natural rosins to a hydrogenation reaction; disproportionated rosins obtained by subjecting natural rosins to a disproportionation reaction; and the like. More preferred as the rosin compound are disproportionated rosins and hydrogenated rosins. Use of such a rosin makes it easy to obtain an adhesive composition having a Gardner color of 1 or less and enables further improvement in heat resistance and light resistance in the adhesive composition.

The purified rosins can be obtained using various known techniques, such as distillation, extraction, and recrystallization. In distillation, for example, distillation of the natural rosin can be generally performed at a temperature of about 200 to 300° C. under reduced pressure of about 0.01 to 3 kPa. In extraction, for example, a purified rosin can be obtained by preparing an aqueous alkaline solution of the natural rosin, extracting insoluble unsaponifiable matter with various organic solvents, and neutralizing the aqueous layer. In recrystallization, for example, a purified rosin can be obtained by dissolving the natural rosin in an organic solvent as a good solvent, distilling off the solvent to form a thick solution, and further adding an organic solvent as a poor solvent.

The disproportionated rosins can be obtained using various known techniques. For example, a disproportionated rosin can be obtained by reacting the natural rosin as a raw material or purified rosin, which is obtained by subjecting the natural rosin to purification treatment, in the presence of a disproportionation catalyst while heating. Examples of usable disproportionation catalysts include various known catalysts, e.g., supported catalysts, such as palladium-carbon, rhodium-carbon, and platinum-carbon; metal powders, such as nickel and platinum; and iodine and iodides, such as iron iodide. The amount of the catalyst used is generally about 0.01 to 5 parts by weight, and preferably about 0.01 to 1 parts by weight per 100 parts by weight of the rosin. The reaction temperature is about 100 to 300° C., and preferably about 150 to 290° C.

The hydrogenated rosins can be obtained by hydrogenating rosin compounds under known hydrogenation conditions for rosin compounds. More specifically, hydrogenation of a rosin compound is performed, for example, by heating the rosin compound in the presence of a hydrogenation catalyst under hydrogen atmosphere at about 2 to 20 MPa and at about 100 to 300° C. The reaction pressure is preferably about 5 to 20 MPa. The reaction temperature is preferably about 150 to 300° C. Examples of hydrogenation catalysts include various known catalysts, such as supported catalysts, metal powders, iodine, and iodides. Examples of supported catalysts include palladium-carbon, rhodium-carbon, ruthenium-carbon, platinum-carbon, and the like. Examples of metal powders include nickel, platinum, and the like. Examples of iodides include iron iodide and the like. Among these, palladium-based, rhodium-based, ruthenium-based, and platinum-based catalysts are preferable for increasing the extent of hydrogenation of the rosin compound and shortening the hydrogenation time. The amount of the hydrogenation catalyst used is generally about 0.01 to 5 parts by weight and preferably about 0.01 to 2 parts by weight per 100 parts by weight of the rosin compound.

To obtain the liquid rosin ester compound described above, it is essential to use a $C_{1-10}$ monohydric alcohol as an alcohol compound. Use of an alcohol having more than 10 carbon atoms reduces the viscosity or flowability of the obtained rosin ester compound. A rosin ester compound that is not in a liquid form leads to a decrease in tack. Moreover, use of alcohols other than monohydric alcohols is problematic in that the viscosity or flowability of the obtained rosin ester is reduced, tack is not maintained satisfactorily, and adhesion properties at low temperatures are unstable (such as causing zipping). Among $C_{1-10}$ monohydric alcohol compounds, $C_{1-8}$ monohydric alcohols are preferable since tack or adhesive strength is exhibited in a well-balanced manner. Examples of alcohol compounds include methanol, ethanol, n-propanol, isopropanol, n-butanol, sec-butanol, tert-butyl alcohol, n-octyl alcohol, 2-ethylhexyl alcohol, and the like. These may be used singly or in a combination of two or more. The alcohol compound is more preferably a $C_{1-4}$ monohydric alcohol, and most preferably a $C_1$ monohydric alcohol, i.e., methanol.

The liquid rosin ester compound has a Gardner color of 1 or less. Since the liquid rosin ester compound has a Gardner color of 1 or less, the adhesive composition exhibits not only excellent initial color and color over time, but also excellent heat resistance and weather resistance for a long period of time. The Gardner color is measured on the Gardner scale according to JIS K 0071.

The liquid rosin ester compound has a glass transition temperature (Tg) of −20° C. or less. Since the liquid rosin ester compound has a glass transition temperature of −20° C. or less, the Tg of the adhesive composition does not increase, thus preventing tack or low temperature adhesive strength from decreasing. The glass transition temperature is preferably −20° C. to −50° C. The glass transition temperature is measured by the method prescribed in JIS K 7121.

The liquid rosin ester compound has a degree of esterification of 93 wt % or more, and preferably 94 to 100 wt %. As used here, the degree of esterification is determined by the ratio of the area of peak corresponding to the monoester in the liquid rosin ester compound and the total area of all the peaks measured by gel permeation chromatography (GPC) for the ester compound. The larger the degree of esterification, the smaller the amount of carboxyl groups remaining in the liquid rosin ester compound, thus reducing the characteristic odor of carboxyl-containing rosin. More specifically, the degree of esterification is calculated according to the following equation (1). Since the liquid rosin ester compound has a degree of esterification of 93% or more, the adhesive composition is substantially odorless and exhibits excellent heat resistance and weather resistance for a long period of time.

$$\text{The degree of esterification in the liquid rosin ester compound (\%)} = [(\text{the area of peak corresponding to the monoester in the liquid rosin ester compound})/(\text{the total area of all the peaks})] \times 100 \quad (1)$$

Moreover, regarding the liquid rosin ester compound, the ratio (Y'/Y) of the total area of peaks in the 16- to 22-min retention time region (Y') to the total area of all the peaks (Y) measured by gas chromatography under the following conditions is 200 ppm or less, and preferably 10 ppm or less. Since the ratio (Y'/Y) of the liquid rosin ester compound is 200 ppm or less, a sufficient odor-improving effect can be obtained in the adhesive composition. The total area of all the peaks (Y) does not include the area of the peak derived from the gas chromatography measurement solvent.

Gas Chromatography Measurement Conditions
Model: product name Agilent 7890A, produced by Agilent
Column: product name HP-5 (inner diameter: 0.32 mm×30 m), produced by Agilent
Column temperature: 50° C.×5 min→10° C./min→300° C.×5 min
Inlet temperature: 300° C.
Carrier gas flow rate: $N_2$, 0.5 ml/min
Detector: hydrogen flame ionization detector (FID)

The method for producing the liquid rosin ester compound is not particularly limited, and known esterification methods can be used. The amounts of the rosin compound and the alcohol compound are not particularly limited. They are determined so that the ratio (equivalent ratio) of the OH groups in the alcohol compound to the COOH groups in the rosin compound is generally within the range of 0.8 to 3.0, and preferably 0.9 to 2.0. The reaction temperature for the esterification reaction is generally about 150 to 320° C., and preferably about 150 to 300° C. The reaction time is generally about 5 to 24 hours, and preferably about 2 to 7 hours. Further, to shorten the reaction time, the esterification reaction can proceed in the presence of a catalyst. Examples of catalysts include acid catalysts, such as p-toluenesulfonic acid; metal hydroxides, such as calcium hydroxide and magnesium hydroxide; metal oxides, such as calcium oxide and magnesium oxide; and the like. Since water is produced as a result of the esterification reaction, the reaction can proceed while removing the produced water from the system. In consideration of the color of the obtained liquid rosin ester compound, the reaction is preferably performed under an inert gas stream. The reaction can be performed under increased pressure, if necessary. The reaction also can proceed in an organic solvent that is nonreactive toward rosin compounds and alcohol compounds. Examples of such organic solvents include hexane, cyclohexane, toluene, xylene, and the like. When an organic solvent is used, the reaction can be suitably performed under reduced pressure if it is necessary to distill off the solvent or unreacted starting materials.

When a purified rosin, a disproportionated rosin, or a hydrogenated rosin is used as the rosin compound, the purification, disproportionation, or hydrogenation of a natural rosin can be performed after esterification of the natural rosin with an alcohol compound; or a natural rosin can be purified, disproportionated, or hydrogenated, followed by esterification of the obtained rosin compound with an alcohol compound.

The liquid rosin ester compound used in the present invention preferably has an acid value of 2 mg KOH/g or less, and more preferably 1 mg KOH/g or less. The viscosity at 40° C. of the liquid rosin ester compound used in the present invention is preferably 2,000 mPa·s or less and more preferably about 50 to 1,500 mPa·s. These properties make it possible to improve heat resistance and obtain excellent tackiness. The measurement methods for the acid value and the viscosity are as follows: acid value measured in accordance with JIS K0070; viscosity measured at 40° C. with a B-type viscometer (product name VISCO BLOCK VTB-250, produced by Tokimec Inc., rotor No.: HM-3).

The adhesive composition of the present invention can be obtained using the liquid rosin ester compound described above. Since the adhesive composition of the present invention is excellent in heat resistance or light resistance, it can be suitably used in applications where heat resistance or light resistance is important. For example, the adhesive composition of the present invention can be suitably used for hot-melt adhesives, which are used in, for example, packaging, bookbinding, or assembling of disposable diapers or sanitary products for which the color over time at high temperatures is important; optical adhesives for which transparency is important, e.g., OCA (optically clear adhesive) and OCR (optically clear resin); adhesives for films; and the like. The content of the liquid rosin ester compound is preferably about 5 to 100 parts by weight based on the composition taken as 100 parts by weight. By setting the content of the liquid rosin ester compound in the above range, an adhesion performance improvement effect due to addition of the liquid rosin ester compound can be obtained. The content of the liquid rosin ester compound is more preferably about 10 to 40 parts by weight.

The types of adhesive composition include an acrylic adhesive composition, a styrene-conjugated diene block copolymer adhesive composition, an ethylene-based hot-melt adhesive composition, and the like. Among these, the acrylic adhesive composition is preferable since it has excellent heat resistance or light resistance and since adhesive strength or tack can be controlled in a wide range.

The acrylic adhesive composition of the present invention comprises the liquid rosin ester compound mentioned above and an acrylic polymer. The acrylic adhesive composition can be obtained by, for example, mixing an acrylic polymer, which is a base polymer, with the liquid rosin ester compound. The content of the acrylic polymer is preferably about 5 to 50 parts by weight based on the composition taken as 100 parts by weight. Setting the content of the acrylic polymer in this range achieves an adhesion performance improvement effect due to addition of the liquid rosin ester compound and does not cause an extreme decrease in holding power. The content of the acrylic polymer is more preferably about 10 to 40 parts by weight.

The acrylic polymer is not particularly limited, and various known homopolymers or copolymers used as acrylic adhesive compositions can be used unmodified. Examples of monomers that can be used for the acrylic polymer include various (meth)acrylic acid esters (the term "(meth)acrylic acid ester" means acrylic acid ester and/or methacrylic acid ester; the same is true for the term "(meth)acrylic acid" below). Specific examples of (meth)acrylic acid esters include methyl (meth)acrylate, ethyl (meth)acrylate, butyl (meth)acrylate, 2-ethylhexyl (meth)acrylate, and the like. These may be used singly or in a combination of two or more. Moreover, to impart polarity to the obtained acrylic polymer, a small amount of (meth)acrylic acid can be used in place of a portion of the (meth)acrylic acid ester. Further, crosslinkable monomers, such as glycidyl (meth)acrylate, 2-hydroxyethyl (meth)acrylate, and N-methylol (meth)acrylamide, may be used in combination with such a (meth)acrylic acid ester. If necessary, other copolymerizable monomers, such as vinyl acetate and styrene, may be used in combination with such a (meth)acrylic acid ester as long as the adhesion properties of the (meth)acrylic acid ester polymer are not impaired. Various known methods can be used as the polymerization method. It is possible to use not only a typical radical polymerization method, but also a living radical polymerization method, a living anionic polymerization method, and the like.

The glass transition temperature of the acrylic polymer, which comprises the (meth)acrylic acid ester as a main component, is not particularly limited, and is generally within the range of about −90 to 0° C., and preferably −80 to −10° C. If the glass transition temperature is much higher than 0° C., the tack tends to decrease. If the glass transition temperature is much lower than −90° C., the adhesive strength tends to decrease. The molecular weight of the acrylic polymer is not particularly limited, and the acrylic polymer preferably has a weight average molecular weight of generally about 50,000 to 2,000,000, and preferably about 100,000 to 1,000,000. By setting the molecular weight in this range, excellent adhesion performance can be obtained. The weight average molecular weight is obtained using polystyrene calibration standards by means of gel permeation chromatography (GPC).

Various known methods can be used as the method for producing the acrylic polymer. For example, a radical polymerization method, such as a bulk polymerization method, a solution polymerization method, or a suspension polymerization method, can be appropriately selected as the method for producing the acrylic polymer. Examples of usable radical polymerization initiators include various known initiators, such as azo-based initiators and peroxide-based initiators. The reaction temperature is generally about 50 to 85° C. The reaction time is about 1 to 8 hours. A polar solvent, such as ethyl acetate or toluene, is generally used as a solvent for the acrylic polymer, and the solution concentration is preferably about 40 to 60 wt %.

In the acrylic adhesive composition of the present invention, the cohesive force and heat resistance can be further enhanced by adding a crosslinking agent, such as a polyisocyanate compound, a polyamine compound, a melamine resin, a urea resin, or an epoxy resin, to the acrylic polymer and tackifier resin. Among these crosslinking agents, it is particularly preferable to use a polyisocyanate compound. Various known polyisocyanate compounds can be used as the polyisocyanate compound. Specific examples include 1,6-hexamethylene diisocyanate, tetramethylene diisocyanate, isophorone diisocyanate, xylylene diisocyanate, tolylene diisocyanate, 4,4-diphenylmethane diisocyanate, and the like. Furthermore, the acrylic adhesive composition of the present invention may suitably contain additives, such as a filler, an antioxidant, and an ultraviolet absorber, as necessary. Without departing from the object of the present invention, the acrylic adhesive composition of the present invention may also contain various known tackifier resins other than the liquid rosin ester compound.

The styrene-conjugated diene block copolymer adhesive composition comprises the liquid rosin ester compound mentioned above and a styrene-conjugated diene block copolymer.

The styrene-conjugated diene block copolymer is a block copolymer obtained by suitably selecting and copolymerizing a styrene compound, such as styrene or methylstyrene, and a conjugated diene compound, such as butadiene or isoprene, according to the intended use. The weight ratio of the styrene compound to the conjugated diene compound is generally 10/90 to 50/50. Preferable specific examples of such block copolymers include SBS block copolymers in which the styrene compound (S)/butadiene (B) weight ratio is within the range of 10/90 to 50/50, SIS block copolymers in which the styrene compound (S)/isoprene (I) weight ratio is within the range of 10/90 to 30/70, and the like. In addition, the styrene-conjugated diene block copolymer encompasses one in which the conjugated diene component of the block copolymer is hydrogenated. Specific examples of a block copolymer in which the conjugated diene component of the block copolymer is hydrogenated include SEBS block copolymers, SEPS block copolymers, and the like.

The styrene-conjugated diene block copolymer adhesive composition may further contain additives, such as oil, a tackifier, a filler, and an antioxidant, as necessary.

The ethylene-based hot-melt adhesive composition comprises an ethylene-based copolymer and the liquid rosin ester compound mentioned above.

The ethylene-based copolymer is a copolymer of ethylene and a monomer copolymerizable with ethylene, and those conventionally used for hot-melt adhesives can be used. Examples of monomers copolymerizable with ethylene include vinyl acetate and the like. The content of vinyl acetate is generally about 20 to 45 wt %. The ethylene-based copolymer preferably has a melt index (190° C., load of 2160 g, 10 min) of about 10 to 400 g/10 min.

The ethylene-based hot-melt adhesive composition may further contain additives, such as wax, a tackifier, a filler, and an antioxidant, as necessary.

EXAMPLES

The method of the present invention is described in more detail below with reference to Examples and Comparative Examples but is not limited to these Examples. In the Examples, "%" indicates "wt %," and "parts" indicates "parts by weight."

Production Example 1: Production of Rosin Ester 1

100 g of Chinese disproportionated rosin (produced by Guangxi Wuzhou Arakawa Chemical Industries, Ltd.) and 300 g of methanol were placed in a 1-L autoclave, and, after removing oxygen in the system, heated to 290° C. The internal pressure of the autoclave reached up to 14 MPa. While the contents (gasses) were expelled every 20 minutes, a reaction was carried out for 2 hours. After the obtained reaction liquid was concentrated with a rotary evaporator, 5 g of calcium hydroxide was added thereto, followed by simple distillation. 6 g of an initial fraction was removed at a liquid temperature of 150 to 270° C. and at a pressure of 0.4 kPa, and 68 g of rosin ester 1 was obtained as a main fraction.

Production Example 2: Production of Rosin Ester 2

65 g of rosin ester 2 was obtained in the same manner as in Production Example 1, except that Chinese hydrogenated rosin (produced by Wuzhou Sun Shine Forestry and Chemicals Co., Ltd. of Guangxi) was used in place of Chinese disproportionated rosin.

Production Example 3: Production of Rosin Ester 3

100 g of Chinese disproportionated rosin (produced by Guangxi Wuzhou Arakawa Chemical Industries, Ltd.) and 300 g of n-butanol were placed in a 1-L autoclave, and, after removing oxygen in the system, heated to 290° C. The internal pressure of the autoclave reached up to 10 MPa. While the contents (gasses) were expelled every 20 minutes, a reaction was carried out for 2 hours. After the obtained reaction liquid was concentrated with a rotary evaporator, 5 g of calcium hydroxide was added thereto, followed by simple distillation. 5 g of an initial fraction was removed at a liquid temperature of 150 to 270° C. and at a pressure of 0.4 kPa, and 71 g of rosin ester 3 was obtained as a main fraction.

Production Example 4: Production of Rosin Ester 9

70 g of rosin ester 9 was obtained in the same manner as in Production Example 3 except that 2-ethylhexyl alcohol was used in place of n-butanol.

Comparative Production Example 1: Production of Rosin Ester 5

500 g of Chinese disproportionated rosin (produced by Guangxi Wuzhou Arakawa Chemical Industries, Ltd.) and 175 g of diethylene glycol were placed in a 1-L flask equipped with a stirrer, a condenser, and a nitrogen inlet tube and heated to 265° C., and a reaction was carried out for 12 hours. The pressure was reduced to 8 kPa, and a reaction was carried out for 2 hours, thereby obtaining 490 g of rosin ester 5.

Comparative Production Example 2: Production of Rosin Ester 6

500 g of Chinese disproportionated rosin (produced by Guangxi Wuzhou Arakawa Chemical Industries, Ltd.) and 55 g of glycerin were placed in a 1-L flask equipped with a stirrer, a condenser, and a nitrogen inlet tube and heated to 270° C., and a reaction was carried out for 12 hours. The pressure was reduced to 8 kPa, and a reaction was carried out for 2 hours, thereby obtaining 480 g of rosin ester 6.

Comparative Production Example 3: Production of Rosin Ester 7

500 g of Chinese disproportionated rosin (produced by Guangxi Wuzhou Arakawa Chemical Industries, Ltd.), 41 g of glycerin, and 28 g of diethylene glycol were placed in a 1-L flask equipped with a stirrer, a condenser, and a nitrogen inlet tube and heated to 260° C., and a reaction was carried out for 12 hours. The pressure was reduced to 8 kPa, and a reaction was carried out for 2 hours, thereby obtaining 480 g of rosin ester 7.

Comparative Production Example 4: Production of Rosin Ester 8

500 g of Chinese disproportionated rosin (produced by Guangxi Wuzhou Arakawa Chemical Industries, Ltd.) and 57 g of pentaerythritol were placed in a 1-L flask equipped with a stirrer, a condenser, and a nitrogen inlet tube and heated to 280° C., and a reaction was carried out for 12 hours. The pressure was reduced to 8 kPa, and a reaction was carried out for 2 hours, thereby obtaining 470 g of rosin ester 8.

Hercolyn D, which is produced by Eastman Chemical, was used as rosin ester 4.

The physical properties of the produced rosin ester compounds were measured as described below. Table 1 shows the results.

Glass transition temperature (Tg): measured by differential scanning calorimetry (heat flux DSC) prescribed in JIS K 7121.

DSC measurement instrument: DSC8230B produced by Rigaku Corporation

Softening point: measured by the ring and ball method of JIS K 2531.

Color: measured on the Gardner scale according to JIS K 0071.

Acid value: measured according to JIS K 0070.

Calculation of Degree of Esterification

The produced rosin ester compounds were individually dissolved in tetrahydrofuran to prepare 0.5% solutions. Each solution was subjected to GPC measurement under the following conditions to calculate degree of esterification by using one of equations (2) to (8) below. Table 1 shows the results.

GPC Measurement Conditions

Model: product name HLC-8220, produced by Tosoh Corporation

Column: product name TSKgel G2000HXL, produced by Tosoh Corporation; product name TSKgel G1000HXL, produced by Tosoh Corporation (one TSKgel G2000HXL column and one TSKgel G1000HXL column were connected)

Developing solvent flow rate: tetrahydrofuran, 1 mL/min

Measurement temperature: 40° C.

Detector: RI $$\text{The degree of esterification (\%) of rosin ester 1, 2, or 4} = [A/\text{the total area of all the peaks}] \times 100 \quad (2)$$

In equation (2), A represents the area of the peak of a weight average molecular weight (obtained using polystyrene calibration standards) of 230 (the area of the peak corresponding to the monoester in rosin ester 1, 2, or 4).

$$\text{The degree of esterification (\%) of rosin ester 3} = [B/\text{the total area of all the peaks}] \times 100 \quad (3)$$

In equation (3), B represents the area of the peak of a weight average molecular weight (obtained using polystyrene calibration standards) of 310 (the area of the peak corresponding to the monoester in rosin ester 3).

$$\text{The degree of esterification (\%) of rosin ester 5} = [(C+D)/\text{the total area of all the peaks}] \times 100 \quad (4)$$

In equation (4), C represents the area of the peak of a weight average molecular weight (obtained using polystyrene calibration standards) of 460 (the area of the peak corresponding to the monoester in rosin ester 5), and D represents the area of the peak of a weight average molecular weight (obtained using polystyrene calibration standards) of 720 (the area of the peak corresponding to the diester in rosin ester 5).

$$\text{The degree of esterification (\%) of rosin ester 6} = [E/\text{the total area of all the peaks}] \times 100 \quad (5)$$

In equation (5), E represents the area of the peak of a weight average molecular weight (obtained using polystyrene calibration standards) of 930 (the area of the peak corresponding to the diester and triester in rosin ester 6).

$$\text{The degree of esterification (\%) of rosin ester 7} = [F/\text{the total area of all the peaks}] \times 100 \quad (6)$$

In equation (6), F represents the area of the peak of a weight average molecular weight (obtained using polystyrene calibration standards) of 890 (the area of the peak corresponding to the diester and triester in rosin ester 7).

$$\text{The degree of esterification (\%) of rosin ester 8} = [G/\text{the total area of all the peaks}] \times 100 \quad (7)$$

In equation (7), G represents the area of the peak of a weight average molecular weight (obtained using polystyrene calibration standards) of 1,190 (the area of the peak corresponding to the diester, triester, and tetraester in rosin ester 8).

The degree of esterification (%) of rosin ester 9=[$H$/the total area of all the peaks]×100      (8)

In equation (8), H represents the area of the peak of a weight average molecular weight (obtained using polystyrene calibration standards) of 400 (the area of the peak corresponding to the monoester in rosin ester 9).

Calculation of (Y'/Y)

The produced rosin ester compounds were individually dissolved in toluene to prepare 2% solutions. The solutions were subjected to gas chromatography measurement under the following conditions to calculate (Y'/Y) using equation (9) below. Table 1 shows the results.

Gas Chromatography Measurement Conditions
Model: product name Agilent 7890A, produced by Agilent
Column: product name HP-5 (inner diameter: 0.32 mm×30 m), produced by Agilent
Column temperature: 50° C.×5 min→10° C./min→300° C.×5 min
Inlet temperature: 300° C.
Carrier gas flow rate: $N_2$, 0.5 ml/min
Detector: hydrogen flame ionization detector (FID)

($Y'/Y$) (ppm)=[the total area of peaks in the 16- to 22-min retention time region ($Y'$)/the total area of all the peaks ($Y$)]×1,000,000      (9)

Example 1

20 parts (solids content) of a 30% ethyl acetate solution of rosin ester 1 shown in Table 1 was added to 80 parts (solids content) of a commercially available solvent-based acrylic polymer, and 0.3 parts of Coronate HX (trade name, produced by Nippon Polyurethane Industry Co., Ltd.), which is a crosslinking agent, was further added. The components were mixed to obtain an adhesive composition.

Examples 2 to 6 and Comparative Examples 1 to 11

The adhesive compositions of Examples 2 to 6 and Comparative Examples 1 to 11 were produced in the same manner as in Example 1, except that the rosin ester compound used and the amount of the components were changed as shown in Table 2.

TABLE 2

| | Acryl | Rosin ester compound | | Coronate HX |
|---|---|---|---|---|
| Example 1 | 80 | Rosin ester 1 | 20 | 0.3 |
| Example 2 | 60 | Rosin ester 1 | 40 | 0.3 |
| Example 3 | 80 | Rosin ester 2 | 20 | 0.3 |
| Example 4 | 60 | Rosin ester 2 | 40 | 0.3 |
| Example 5 | 80 | Rosin ester 3 | 20 | 0.3 |
| Example 6 | 60 | Rosin ester 3 | 40 | 0.3 |
| Comparative Example 1 | 100 | — | 0 | 0.3 |
| Comparative Example 2 | 80 | Rosin ester 4 | 20 | 0.3 |
| Comparative Example 3 | 60 | Rosin ester 4 | 40 | 0.3 |
| Comparative Example 4 | 80 | Rosin ester 5 | 20 | 0.3 |
| Comparative Example 5 | 60 | Rosin ester 5 | 40 | 0.3 |
| Comparative Example 6 | 80 | Rosin ester 6 | 20 | 0.3 |
| Comparative Example 7 | 60 | Rosin ester 6 | 40 | 0.3 |
| Comparative Example 8 | 80 | Rosin ester 7 | 20 | 0.3 |
| Comparative Example 9 | 60 | Rosin ester 7 | 40 | 0.3 |

TABLE 1

| | | Number of hydroxyl groups in alcohol | Color | Softening point (° C.) | Tg (° C.) | Acid value | Degree of esterification (%) | Y'/Y (ppm) |
|---|---|---|---|---|---|---|---|---|
| Rosin ester 1 | Disproportionated rosin methyl ester | 1 | 1G or less | Liquid state | −23 | 1 | 97 | 1 |
| Rosin ester 2 | Hydrogenated rosin methyl ester | 1 | 1G or less | Liquid state | −29 | 1 | 98 | 7 |
| Rosin ester 3 | Disproportionated rosin butyl ester | 1 | 1G or less | Liquid state | −42 | 1 | 94 | 37 |
| Rosin ester 9 | Disproportionated rosin 2-ethylhexyl ester | 1 | 1G | Liquid state | −46 | 1 | 95 | 100 |
| Rosin ester 4 | Hercolyn D (produced by Eastman Chemical) | 1 | 3 + G | Liquid state | −27 | 7 | 91 | 9,850 |
| Rosin ester 5 | Disproportionated rosin diethylene glycol ester | 2 | 7G | Liquid state | −12 | 30 | 82 | 2,150 |
| Rosin ester 6 | Disproportionated rosin glycerin ester | 3 | 5G | 100 | 59 | 5 | 91 | 1,340 |
| Rosin ester 7 | Disproportionated rosin glycerin/diethylene glycol ester | 2/3 | 6G | 75 | 36 | 5 | 83 | 1,750 |
| Rosin ester 8 | Disproportionated rosin pentaerythritol ester | 4 | 8G | 114 | 70 | 15 | 81 | 890 |

TABLE 2-continued

|  | Acryl | Rosin ester compound | | Coronate HX |
|---|---|---|---|---|
| Comparative Example 10 | 80 | Rosin ester 8 | 20 | 0.3 |
| Comparative Example 11 | 60 | Rosin ester 8 | 40 | 0.3 |

Evaluation Methods

Each of the obtained adhesive compositions was individually applied to 38-μm-thick polyester films with a cube-shaped applicator to a film thickness of about 50 μm when dried (coating width: 25 mm), and the solvent in the adhesive composition varnish was air-dried. The films were then dried in an air circulation dryer at 105° C. for 5 minutes to prepare sample tapes, and the sample tapes were cured under the conditions of 23° C. and 65% RH for one week to obtain adhesive tapes. The adhesive tapes were used for the following evaluations.

Adhesive Strength

Each sample tape was individually pressed onto polyethylene plate substrates, which are adherends, with a 2-kg rubber roller so that the adhesion area was 25 mm×125 mm according to the method of JIS Z 0237, and the substrates were then allowed to stand at 20° C. for 24 hours. Thereafter, a 180° peel test was performed at 5° C. and at a peel rate of 300 mm/min with a Tensilon tensile tester to measure adhesive strength per 25-mm width (N/25 mm). Table 3 shows the results. In Table 3, (Z) means a phenomenon (zipping) in which the tape is not peeled off smoothly and is peeled off with a ripping sound.

Ball Tack

Measurement was performed at an inclination of 30 degrees and at a measurement temperature of 23° C. using the J. Dow method according to JIS Z 0237. Table 3 shows the results. The numbers in the table represent ball numbers. A higher number indicates higher tack.

Each of the obtained adhesive compositions was individually applied to glass plates to a film thickness of about 100 μm when dried (coating width: 25 mm), and the solvent in the adhesive composition varnish was air-dried. The plates were then dried in an air circulation dryer at 105° C. for 5 minutes, and glass plates were individually attached to the adhesive surfaces to obtain test pieces.

Heat Resistance Test

The test pieces were stored in a constant temperature dryer at 105° C., and the appearance after 120 hours was visually examined. Table 3 shows the results.
1: Colorless and Transparent
2: Slight yellowing
3: Obvious yellowing Light Resistance Test The appearance of the test pieces after exposure to a high pressure mercury lamp (EYE Super UV Tester, produced by Iwasaki Electric Co. Ltd., 50 mW/cm²) for 24 hours was visually examined. Table 3 shows the results.
1: Colorless and transparent
2: Slight yellowing
3: Obvious yellowing

TABLE 3

|  | Adhesive strength N/inch 5° C., PE | Ball tack Ball No. | Heat resistance 105° C. 120 hours | Light resistance 50 mW/cm² 24 hours |
|---|---|---|---|---|
| Example 1 | 4.9 | 24 | 1 | 1 |
| Example 2 | 6.9 | 24 | 1 | 1 |
| Example 3 | 5.5 | 24 | 1 | 1 |
| Example 4 | 6.1 | 24 | 2 | 1 |
| Example 5 | 4.3 | 20 | 1 | 1 |
| Example 6 | 5.1 | 20 | 1 | 1 |
| Comparative Example 1 | 3.6 | 25 | 1 | 1 |
| Comparative Example 2 | 4.5 | 20 | 2 | 2 |
| Comparative Example 3 | 5.1 | 20 | 3 | 3 |
| Comparative Example 4 | 5.2 | 19 | 3 | 3 |
| Comparative Example 5 | 6.3 | 17 | 3 | 3 |
| Comparative Example 6 | 4.6 | 13 | 1 | 3 |
| Comparative Example 7 | 0.3 to 5.5(Z) | Did not stop | 1 | 3 |
| Comparative Example 8 | 5.2 | 13 | 1 | 2 |
| Comparative Example 9 | 0.2 to 4.8(Z) | 9 | 1 | 3 |
| Comparative Example 10 | 3.9 | 8 | 1 | 3 |
| Comparative Example 11 | 0.2 to 4.5(Z) | Did not stop | 1 | 3 |

Example 7

20 parts of rosin ester 1 shown in Table 1 was added to 80 parts of a commercially available acrylic block copolymer (product name Kurarity LA-2140e, produced by Kuraray Co. Ltd.), and the components were melt-mixed at 180° C. for one hour to obtain an adhesive composition.

Examples 8 to 12 and Comparative Examples 12 to 16

The adhesive compositions of Examples 8 to 12 and Comparative Examples 12 to 16 were produced in the same manner as in Example 7, except that the rosin ester compound used and the amounts of the components were changed as shown in Table 4.

TABLE 4

|  | Acryl | Rosin ester compound | |
|---|---|---|---|
| Example 7 | 80 | Rosin ester 1 | 20 |
| Example 8 | 60 | Rosin ester 1 | 40 |
| Example 9 | 80 | Rosin ester 2 | 20 |
| Example 10 | 60 | Rosin ester 2 | 40 |
| Example 11 | 80 | Rosin ester 9 | 20 |
| Example 12 | 60 | Rosin ester 9 | 40 |
| Comparative Example 12 | 100 | — | 0 |
| Comparative Example 13 | 80 | Rosin ester 4 | 20 |
| Comparative Example 14 | 60 | Rosin ester 4 | 40 |
| Comparative Example 15 | 80 | Rosin ester 6 | 20 |
| Comparative Example 16 | 60 | Rosin ester 6 | 40 |

Evaluation Methods

Each of the obtained adhesive compositions was individually applied to 38-μm-thick polyester films to a film thickness of about 60 μm with a bar coater (No. 24) (coating width: 25 mm) to obtain adhesive tapes. The adhesive tapes were used for the following evaluations.

Adhesive Strength

Each sample tape was individually pressed onto polyethylene plate substrates, which are adherends, with a 2-kg rubber roller so that the adhesion area was 25 mm×125 mm according to the method of JIS Z 0237, and the substrates were then allowed to stand at 20° C. for 24 hours. Thereafter, a 180° peel test was performed at 23° C. and at a peel rate of 300 mm/min with a Tensilon tensile tester to measure adhesive strength per 25-mm width (N/25 mm). Table 5 shows the results. In Table 5, (Z) means a phenomenon (zipping) in which the tape is not peeled off smoothly and is peeled off with a ripping sound.

Ball Tack

Measurement was performed at an inclination of 30 degrees and at a measurement temperature of 23° C. using the J. Dow method according to JIS Z 0237. Table 5 shows the results. The numbers in the table represent ball numbers. A higher number indicates higher tack.

Holding Power

Each sample tape was individually pressed onto stainless steel plates so that the adhesion area was 25 mm×25 mm with a 2-kg rubber roller according to the PSTC-7 method, and the obtained substrates were allowed to stand at 20° C. for 24 hours. Subsequently, a 1-kg load was applied at 23° C. for 24 hours using a creep tester (product name Holding Power Tester, produced by Tester Sangyo Co., Ltd.), and the slippage (mm) between the adhesive surface of each sample tape and the stainless steel plate was measured. Table 5 shows the results. A smaller numerical value indicates higher holding power.

Usual test tubes were individually filled half-full with each of the obtained adhesive compositions, covered with aluminum foil, stored in a constant temperature dryer at 180° C., and heated for 24 hours. Thereafter, the following evaluations were performed. Table 5 shows the results.

Heat Resistance

The degree of yellowing was visually examined.
1: Almost no yellowing
2: Slight yellowing
3: Yellowing Odor Sensory evaluation was performed. The results are all obtained by relative comparison.
1: Almost no odor
2: Slight odor
3: Odor

TABLE 5

|  | Adhesive strength N/inch 23° C., PE | Ball tack Ball No. | Holding power mm | Heat resistance 180° C. 24 hours | Odor |
|---|---|---|---|---|---|
| Example 7 | 2.7 | 8 | 0 | 1 | 1 |
| Example 8 | 2.4 | 9 | 0 | 1 | 1 |
| Example 9 | 2.0 | 7 | 0 | 1 | 1 |
| Example 10 | 1.4 | 8 | 0 | 1 | 1 |
| Example 11 | 1.0 | 7 | 0 | 1 | 1 |
| Example 12 | 0.4 | 8 | 0 | 1 | 1 |
| Comparative Example 12 | 0.1 | 5 | 0 | 1 | 1 |
| Comparative Example 13 | 2.4 | 8 | 0 | 3 | 3 |
| Comparative Example 14 | 2.2 | 9 | 15 | 3 | 3 |
| Comparative Example 15 | 3.1 | 7 | 0 | 2 | 2 |
| Comparative Example 16 | 0.5(Z) | Did not stop | 0 | 3 | 2 |

The invention claimed is:

1. An adhesive composition comprising a liquid rosin ester compound, the liquid rosin ester compound being obtained by reacting at least one member selected from the group consisting of disproportionated rosins and hydrogenated rosins with a $C_{1-8}$ monohydric alcohol compound and having a Gardner color of 1 or less, a glass transition temperature of −20° C. or less, a degree of esterification of 93 wt % or more, an acid value of 2 mg KOH/g or less, and a ratio (Y'/Y) of the total area of peaks in the 16- to 22-min retention time region (Y') to the total area of all the peaks (Y) measured by gas chromatography under the following conditions of 200 ppm or less:

Gas Chromatography Measurement Conditions
Column: (5%-Phenyl)-methylpolysiloxane, inner diameter: 0.32 mm×30 m
Column temperature: 50° C.×5 min→10° C./min→300° C.×5 min
Inlet temperature: 300° C.
Carrier gas flow rate: $N_2$, 0.5 ml/min
Detector: hydrogen flame ionization detector (FID).

2. An acrylic adhesive composition comprising the adhesive composition according to claim 1, the adhesive composition comprising an acrylic polymer.

3. A hygiene product, comprising:
a topsheet;
a backsheet;
a water-absorbent resin; and
the adhesive composition according to claim 1.

* * * * *